United States Patent [19]

Kleefeldt et al.

[11] Patent Number: 4,837,567

[45] Date of Patent: Jun. 6, 1989

[54] SECURITY SYSTEM FOR A MOTOR VEHICLE

[75] Inventors: Frank Kleefeldt, Heiligenhaus; Horst Brackmann, Velbert; Peter Bartel, Hattingen, all of Fed. Rep. of Germany

[73] Assignee: Kiekert GmbH & Co. Kommanditgesellschaft, Heiligenhaus, Fed. Rep. of Germany

[21] Appl. No.: 97,226

[22] Filed: Sep. 15, 1987

Related U.S. Application Data

[63] Continuation-in-part of Ser. No. 13,196, Feb. 9, 1987, abandoned, which is a continuation of Ser. No. 770,686, Aug. 29, 1985, abandoned.

[30] Foreign Application Priority Data

Aug. 31, 1984 [DE] Fed. Rep. of Germany ....... 3432064

[51] Int. Cl.$^4$ .......................... G06F 7/04; G08C 19/00
[52] U.S. Cl. .......................... 340/825.31; 340/825.72; 340/825.69; 361/172; 70/252; 70/256; 307/10.5
[58] Field of Search ........... 340/825.31, 825.3, 825.34, 340/825.69, 542, 572, 528, 520, 63, 64, 65, 825.72; 70/252, 237, 256, 278, 257; 180/287; 361/170, 171, 172; 307/10 AT

[56] References Cited

U.S. PATENT DOCUMENTS

| | | | |
|---|---|---|---|
| 4,250,533 | 2/1981 | Nelson | 361/172 |
| 4,366,466 | 12/1982 | Lutz | 340/64 |
| 4,433,562 | 2/1984 | Tsuchiya | 70/252 X |
| 4,686,529 | 8/1987 | Kleefeldt | 340/825.69 |
| 4,712,398 | 12/1987 | Clarkson et al. | 361/172 |
| 4,719,460 | 1/1988 | Takeuchi et al. | 340/825.31 |
| 4,723,121 | 2/1988 | van der Boom et al. | 340/825.31 |

FOREIGN PATENT DOCUMENTS

0001659 1/1987 Japan ..................... 70/252

Primary Examiner—Robert L. Griffin
Assistant Examiner—Ralph Smith
Attorney, Agent, or Firm—Herbert Dubno; Andrew Wilford

[57] ABSTRACT

A security system has a key including a transmitter for emitting a coded signal and a receiver for the signal and connected to a latch of the vehicle for unlocking a door secured by the latch only when the coded signal is received. A column bolt is displaceable in a housing fixed around the steering column between a locking position preventing the column from rotating and a freeing position. A barrel rotatable in the housing is formed with an axially open pocket generally complementary to the key. A switch is actuatable in one end position of the barrel for starting the vehicle and a locking pin is displaceable in the barrel and engageable into the pocket and into a lateral recess of the key when same is fitted in the pocket. A lever can engage in the recess of the barrel in the other of the end positions and can also engage in this other end position with the pin to push same into the pocket and into the recess of the key therein. A spring urges the lever into a normal position engaged in the recess and pulled away from the pin, so that, in the normal position of the lever and the other end position of the barrel, the barrel cannot rotate in the housing and the key can be moved axially out of the pocket. A solenoid is connected to the lever and energizable only when the coded signal is received in the other end position of the barrel for pulling the lever out of the barrel recess and pushing the pin into the key recess.

7 Claims, 4 Drawing Sheets

SECURITY SYSTEM FOR A MOTOR VEHICLE

CROSS REFERENCE TO RELATED APPLICATION

This is a continuation-in-part of application Ser. No. 013,196 filed on Feb. 9, 1987, now abandoned which is a continuation of Ser. No. 770,686 filed Aug. 29, 1985, now abandoned.

FIELD OF THE INVENTION

The present invention relates to a security system for a motor vehicle. More particularly this invention concerns the locks for the doors, for the steering wheel, and for the drive.

BACKGROUND OF THE INVENTION

It is known from commonly owned patent application Ser. Nos. 555,471 and 568,610 filed respectively by W. Bongard et al and F. Kleefeldt on Nov. 28, 1983 and Jan. 6, 1984 (now U.S. Pat. Nos. 4,596,985 and 4,686,529, respectively) and from German patent document No. 3,224,049 to control a door lock, typically of a central lock system, by means of a door-signal receiver and a decoder that unlock the lock when the receiver receives an appropriately encoded signal. A hand-held transmitter, typically a miniaturized device carried on the user's key chain, can generate the appropriately encoded door signal, so that no external or mechanical door lock need be provided, making the vehicle very secure.

In addition the motor vehicle has a drive for propelling the vehicle and a drive or ignition switch operable only by a drive key to energize the various devices—electric fuel pump, ignition system, injectors—that make the drive work by means of the vehicle's wiring. Thus the drive can only be powered when this switch is operated by the key inserted into it. Typically this ignition switch is a standard mechanical switch operated by a bitted key and provided on the steering column so this key can also operate a steering lock that physically arrests the steering wheel and prevents the vehicle, even if hot-wired, from being steered.

Thus the driver uses the radio key to get into his or her vehicle, and then employs a standard key to unlock the wheel and operate the drive system. The ignition key can be left, for instance, with a parking attendant, that is in a situation where the vehicle need not be locked, so that the owner maintains a high level of security, which is typically increased by means of the coded radio-frequency door signal.

Some problems have arisen with the use of steering-column locks. They can get jammed and become impossible to unlock without dismantling the steering column, and they can lock up while the vehicle is moving and thereby create a considerable hazard. Furthermore a skilled thief who does gain entry to the vehicle can normally rip out the lock cylinder so as to be able to unlock the steering column and actuate the drive system directly with a screwdriver twisted in the empty lock sleeve. Also, it is possible to hot wire the engine and start it without actuation of the ignition switch, provided of course somehow the steering-column lock is not a problem, a problem not overcome by replacing the mechanical drive lock with a radio-type remote-control one like the one operating the lock system.

In the above-cited copending parent application a security system is described which has, as is known, a drive for propelling the vehicle and including a drive element which must be enabled for the drive system to function. A drive switch operable only by a drive key is connected by wiring to the drive and the element thereof for enabling the element and powering the drive when the switch is operated by the key inserted into it. The door-lock system includes a door-signal receiver, and decoder, and a door lock for unlocking the lock when the receiver receives an appropriately encoded signal. A transmitter can generate the appropriately encoded door signal. According to this earlier invention the transmitter is the key and is capable of transmitting an appropriately encoded drive signal, the drive switch includes a drive-signal receiver, and a decoder is connected between the drive-signal receiver and the element for enabling same only when the appropriately encoded drive signal is received by the drive-signal receiver.

Thus according to the previous invention the same radio-frequency transmitter is used both to remotely open the door locks, and to get the car going once inside it. Both the lock system and the drive are therefore operated by respective decoders and electronic circuits which can rely on exotic codings as described in the above-mentioned patent, making the keys virtually impossible to reproduce or replicate. In addition the system enables a drive device that can be any part critical to the operation of the drive, as for instance a relay or gate in the ignition system, a valve in a fuel pump, or a gate at any of a dozen locations in the drive. The radio-frequency signal is directed through the vehicle wiring to the decoder and cutout device somewhere in the drive, so that a clever thief who attempts to hot wire this device must find it first. Since it can be made small enough to be effectively hidden and/or encapsulated in a standard part, it can be made very small to make hot-wiring the car so very difficult that a steering-column lock becomes unnecessary.

The drive signal and receiver in my earlier system are such that the drive signal can only be received by the drive-signal receiver when the transmitter is inserted in the lock. This can be done by shielding the drive-signal receiver or making the receiver for it so very insensitive that it can only receive the signal from immediately adjacent the transmitter. Since cracking the code is virtually impossible, such a key can freely be left with someone like a repair person who must operate the car. Normally the drive and door signals are the same, or are selected from the same sequences.

Typically the critical drive device according to the earlier invention is mainly operated by another power source, such as the vehicle battery. The decoder and controller serve merely to disable and enable it, not to operate it; once enabled by the decoder, the critical drive device remains on even if the signal is no longer sent.

The switch, in order to operate in the rotary fashion of a standard ignition or drive switch has a rotary cylinder shaped complimentarily to the transmitter key and including mechanical switches connected between the battery and the drive. Thus from outside the vehicle the user merely points the transmitter at the door-signal receiver, but once inside he or she inserts it into the dashboard and turns it in the standard manner, that is through a small arc to the right for the on position and full right for start. The drive is shut off in the standard manner by turning the key to the left and withdrawing it. The only difference is that when the key is put into the lock its transmitter must be actuated, normally according to the instant invention by depressing a button on the side of the key.

This arrangement is relatively efficient, but still lacks some features. For instance, even though a steering wheel lock becomes less essential due to the difficulty of starting or operating the vehicle without the proper electronic key, the system does not prevent the vehicle from being tampered with and even forcibly moved. For instance the car can be towed without difficulty, or can be pushed away since the steering remains operational.

U.S. Pat. No. 4,438,426 of Adkins describes a system wherein an automobile ignition key can emit a coded signal which, if recognized by a decoding circuit inside the lock, allows the vehicle to be operated. U.S. Pat. No. 4,250,533 of Nelson integrates the receiver and decoder, albeit using a transmitted signal, and gives the electronic key also mechanical functions. These arrangements are not suitable for use in a vehicle having a remotely operated lock system, instead the door and ignition locks are substantially identically constructed both mechanically and electronically.

German patent document No. 3,005,890 has a standard mechanical key also equipped with a transmitter capable of emitting a coded signal. Thus the locks are mainly mechanical, with the electronic coded function a simple add-on for extra security. They cannot work with a remotely operable door-lock system of the type described in above-mentioned German patent document No. 3,244,049 which requires a separate door and ignition key.

None of the described systems can also work on a column lock that prevents the vehicle from being steered when not unlocked by a proper key. Even with the most complex electronic systems, the combined functions of locking the steering wheel, operating the ignition/starting system, and unlocking the doors are never unified and controllable from a single key.

OBJECTS OF THE INVENTION

It is an object of the present invention to provide an improved security system and steering-wheel lock.

Another object is the provision of such a security system and steering-wheel lock which advance principles of my earlier invention and which overcome the above-given disadvantages, that is which provides a high degree of security, and which can be integrated with a steering-column lock.

SUMMARY OF THE INVENTION

The improved security system of this invention has a key including a transmitter for emitting a coded signal and formed with a laterally open recess, a receiver for the signal and connected to a latch of the vehicle for unlocking a door secured by the latch only when the coded signal is received, and a housing secured to the vehicle's steering column. A column bolt is displaceable in the housing between a locking position preventing relative rotation between the column and the housing and a freeing position out of engagement with the column and with the column freely rotatable in the housing. A barrel rotatable in the housing between end positions is formed with an axially open pocket generally complementary to the key and with a radially open latching recess. A switch is actuatable in one end position of the barrel for starting the vehicle and a locking pin is radially displaceable in the barrel and engageable into the pocket and into the recess of the key when same is fitted in the pocket. A lever has one arm engageable in the recess of the barrel in the other of the end positions and another arm engageable in this other end position with the pin to push same into the pocket and into the recess of the key therein. A spring urges the lever into a normal position with the one arm engaged in the recess and the other arm pulled away from the pin, so that, in the normal position of the lever and the other end position of the barrel, the barrel cannot rotate in the housing and the key can be moved axially out of the pocket. A solenoid is connected to the lever and energizable in the other end position of the barrel for pulling the lever out of the normal position and thereby pulling the one arm out of the barrel recess and pushing the other arm against the pin to push same in turn into the key recess. Thus when the solenoid is energized the barrel and key can turn in the housing but the key cannot be withdrawn axially from the barrel. Another receiver and a decoder are connected to the solenoid for receiving the signal from the key in the pocket and for energizing the solenoid only on receiving the signal.

Thus the system of this invention integrates all of the three functions—remotely operable door latches, electronically encoded starting, and steering-column lock—in one improved lock system. Ease of use and general simplicity are therefore maximized.

According to another feature of this invention a spring is braced between the column bolt and the housing and continuously urges the bolt into locking engagement with the column. In addition the solenoid is engageable with an extension of one of the arms of the lever and the switch is an on-off switch and the barrel is formed with a camming groove engaging the switch.

In accordance with a further feature of this invention a link, typically an eccentric pin, is provided on the barrel engaging the column bolt for displacing same out of engagement with the column on displacement of the barrel into the other end position. This system is ideally combined with the above-mentioned spring that urges the bolt into locking engagement with the column.

DESCRIPTION OF THE DRAWING

The above and other features and advantages will become more readily apparent from the following, reference being made to the accompanying drawing in which.

SPECIFIC DESCRIPTION

Figure 1:
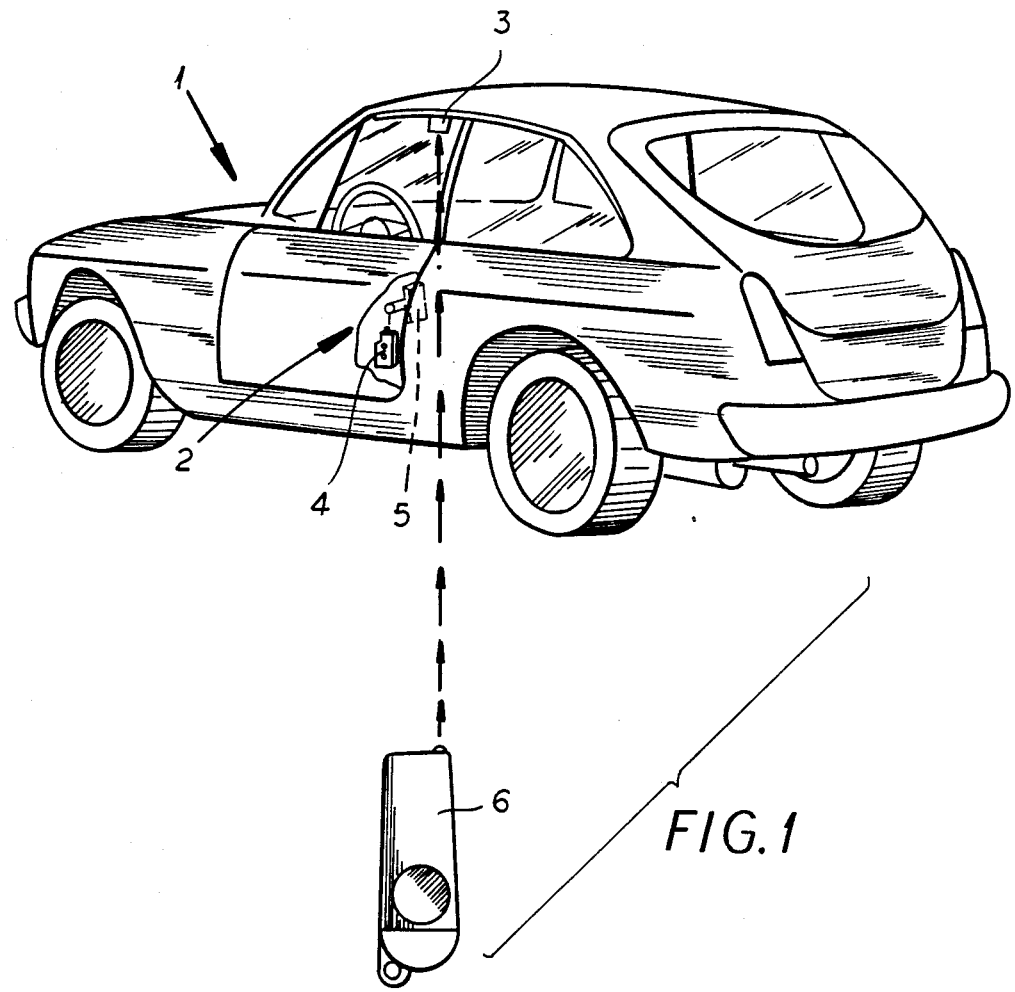
FIG. 1 is a perspective view of a vehicle with the security system of this invention, the key being shown in large scale and the vehicle in small scale.

As seen in FIG. 1 a motor vehicle 1 is provided with a central-lock system 2 including an actuator 4 operating a mechanical door latch 5. The central lock system 2 is itself controlled by a door-signal receiver 3 here mounted inside a window of the vehicle. A hand-held transmitter key 6 can generate as described in the above-mentioned applications of Kleefeldt and Bongard an encoded radio-frequency signal that is received and decoded. If the signal is properly coded, the lock system 2 unlocks the doors of the vehicle 1. This type of system is now fairly standard and can use optical signals generated by a diode transmitter 118 at the outer end of the key 106. Pressing a button 117 on the side of the key 6 causes the coded signal to be transmitted by the output element constituted by the diode 118.

Figure 2:
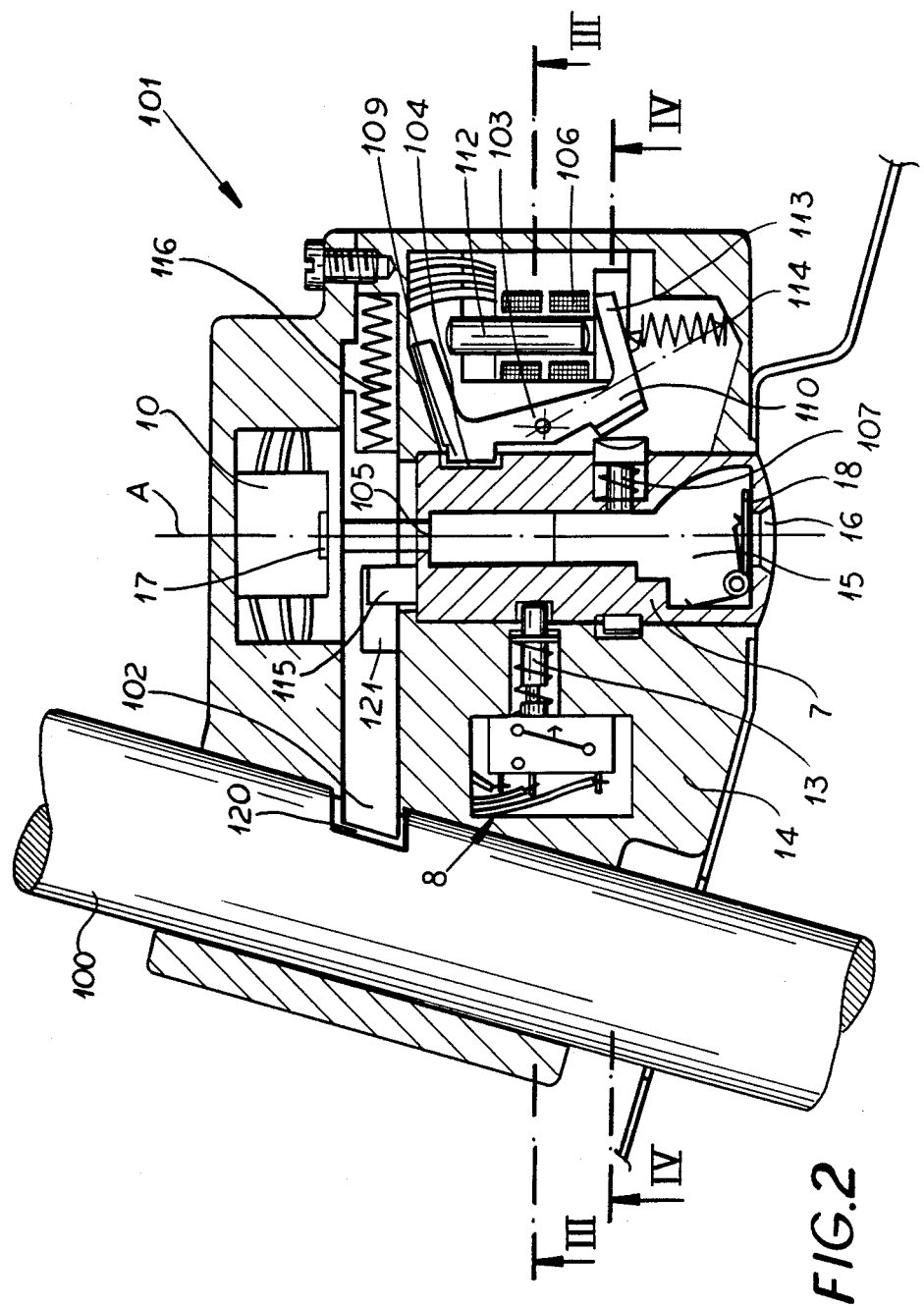
FIG. 2 is partly diagrammatic but mainly axially sectional view through the steering-wheel latch system of this invention.
Figure 3:
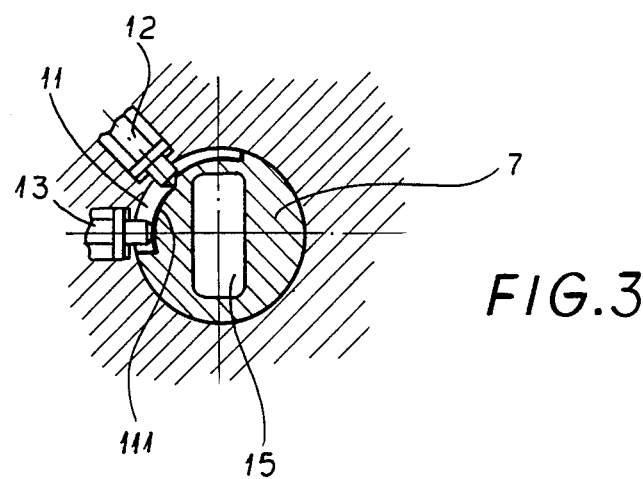
FIGS. 3 and 4 are cross sections taken along the planes indicated respectively at III—III and IV—IV of FIG. 2.
Figure 4:
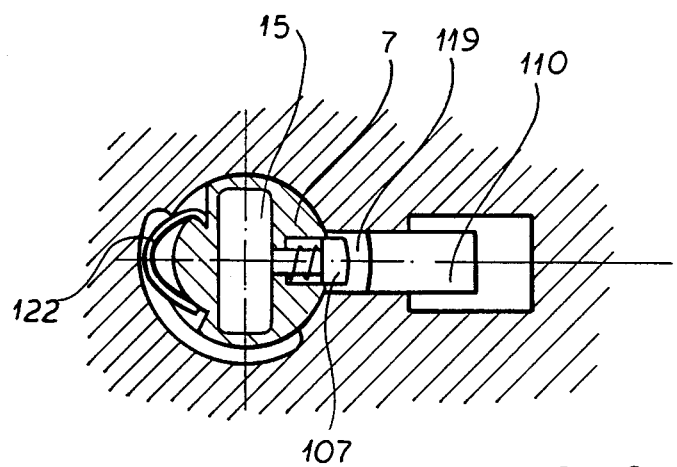

According to this invention as seen also in FIGS. 2, 3, 4 and 7, the door-key transmitter 6 is shaped to fit within an opening 15 of a barrel 7 of a steering-column-/ignition lock assembly 101 The assembly 101 is provided as seen in FIG. 2 with a drive-signal receiver 17 connected via a decoding circuit 10 to the switch 13 that serves to start the vehicle 1 and that is in turn connected via wiring 8 to the rest of the starting-ignition system of the engine of the motor vehicle 1.

The transmitter key 6 is physically shaped to fit in the complementary recess 15 of the barrel 7, and this barrel 7 is formed externally as a cylinder having an end hole 16 normally covered by a spring-loaded flap 18 and rotatable about an axis A in a stationary sleeve 14 surrounding the rotatable steering column 100. The barrel 7 has a stepped camming groove 11 and is formed on its axis A at the end of the opening with a port 104 through which the optical receiver 17 is exposed so that when the key 6 is fully inserted into the opening 15 its output element 118 will be directly juxtaposed on the axis A with the receiver 17. The drive signal can be the same as the door signal, and the barrel 7 contains a switch 12 which must be operated physically to allow the vehicle to operate at all, and the switch 13 connected to the vehicle wiring 8.

Figure 5:
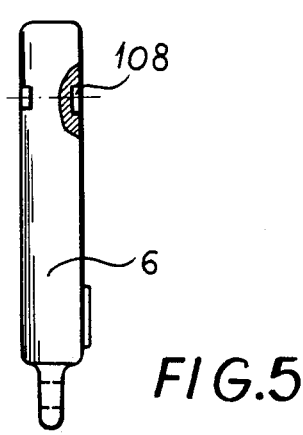
FIGS. 5 and 6 are side and top views of the key according to the invention, partly in section.
Figure 6:
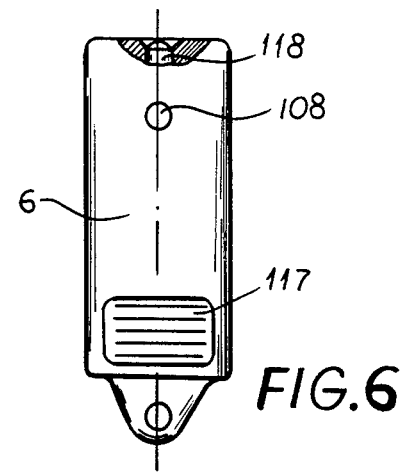
Figure 7:
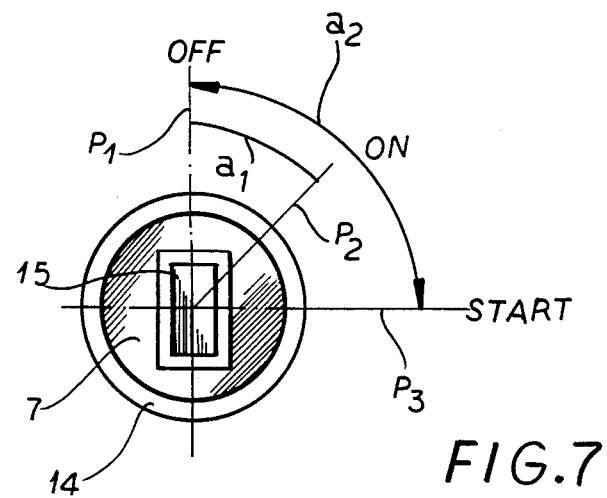
FIG. 7 is a front view of the key hole illustrating the operation of the system of this invention.

The lock barrel 7 is provided with a radially outwardly spring-biased locking bolt or button 107 that can extend outward into a radially delimited slot 119 formed in the housing sleeve 14 and opening radially inward toward the barrel 7. Inwardly the bolt 107 can project in to the seat or recess 15 and engage in either of two recesses 108 formed in opposite sides of the key 6 as shown in FIGS. 5 and 6. In addition the barrel 7 is formed with a radially outwardly open and angularly short recess 104 into which can engage an arm 109 of a two-arm lever 103 that is radially inwardly biased by a spring 114 braced against the end 113 of its other arm 110. When this arm 109 engages in the recess 104 it effectively blocks the barrel 7 from turning and actuating either of the switches 12 and 13.

The steering column 100 is formed with a radially open recess 120 into which can engage another locking bolt 102 which is biased by a spring 116 radially toward the column 100. This bolt 102 is formed with a laterally open recess 121 in which engages an eccentric pin 114 of the barrel 7 so that rotation of the barrel 7 can pull the bolt 102 out of the column 100.

The two-arm lever 103, as described above, is normally biased by the spring 114 into a position with its one arm 109 pushing radially inward toward the barrel 7 and its opposite arm 110 pulled radially away from the button 107 so that normally the barrel 7 is locked in the sleeve housing 14. The force of this spring 114 can be opposed by the force of the armature 112 of a solenoid 106 that is operated by the decoder 10.

The structure described above functions as follows:
Once the car 1 has been opened as described above, the key 6 is inserted axially fully into the hole 15 of the barrel 7 with the key 6 in a vertical plane $P_1$ shown in FIG. 7. The user then actuates the button 117 to transmit the coded signal from the output element 118 to the receiver element 17. Presuming that the decoder 10 recognizes that the received signal was properly encoded, it energizes the solenoid coil 10. Thus the lever 103 is pivoted both so as to pull the arm 109 out of the recess 104 and to push the bolt 107 into the recess 108. This makes it possible to turn the key 6 and barrel 7 but impossible to withdraw the key 6.

When the key 6 and barrel 7 are then pivoted through an arc $a_1$ to lie on a plane $P_2$, the camming groove operates the switch 12 to feed power to the engine circuits. Then, when rotated fully through a larger arc $a_2$ to a plane $P_3$, the starting switch 13 is operated to energize the wiring 8 and start the engine. Once the barrel 7 moves from the $P_1$ position the lever arm 109, even if released by the solenoid 106, rides on the smooth outside surface of the barrel 7 and similarly the lock bolt 107 bears on the smooth inside surface of the sleeve 114. Thus the transmitter need only be actuated to allow the key 6 to start turning, but can be released once such turning is started. During normal operation the barrel 7 is held be a spring 122 in the $P_2$ position, in which the switch 12 remains actuated.

Rotation from the $P_1$ position to the $P_2$ position also causes the pin 15 of the barrel 7 to pull the bolt 102 out of the recess 120 and thereby free the column 100 to rotate.

To turn off the engine the key is reverse rotated to the $P_1$ position. The lever 103 snaps into the recess 104 and simultaneously releases the bolt 107 from the hole 108, making it possible to pull the key 6 out of the lock assembly 101. This action also releases the bolt 102 so that, as soon as it aligns with the hole 120, the spring 116 will push it into this hole 120 and lock the column 100.

We claim:
1. In a motor vehicle having a mechanical door latch and a rotatable steering column, a security system comprising:
 a key formed with a laterally open recess and including transmitter means for emitting a coded signal;
 means for receiving the signal and connected to the latch for unlocking a door secured thereby only when the coded signal is received;
 a housing secured to the steering column;
 a column bolt displaceable in the housing between a locking position preventing relative rotation between the column and the housing and a freeing position out of engagement with the column and with the column freely rotatable in the housing;
 a barrel rotatable in the housing between end positions and formed with an axially open pocket generally complementary to the key and with a radially open latching recess;
 means coupling the barrel to the bolt for displacement of the bolt between its locking and freeing positions on displacement of the barrel between its end positions;
 means including a switch actuatable in one end position of the barrel for starting the vehicle;
 a locking pin radially displaceable in the barrel and engageable into the pocket and into the recess of the key when same is fitted in the pocket;
 a lever having one arm engageable in the recess of the barrel in the other of the barrel end positions and another arm engageable in this other barrel end position with the pin to push same into the pocket and into the recess of the key therein;

spring means for urging the lever into a normal position with the one arm engaged in the barrel recess and the other arm pulled away form the pin, whereby, in the normal position of the lever and the other barrel end position of the barrel, the barrel cannot rotate in the housing and the key can be moved axially out of the pocket;

solenoid means connected to the lever and energizable in the other barrel end position of the barrel for pulling the lever out of the normal position and thereby pulling the one arm out of the barrel recess and pushing the other arm against the pin to push same in turn into the key recess, whereby when the solenoid means is energized the barrel and key can turn in the housing but the key cannot be withdrawn axially from the barrel; and means in the housing including a receiver and a decoder connected to the solenoid means for receiving the signal from the key in the pocket and for energizing the solenoid means only on receiving the signal.

2. The improved security system defined in claim 1, further comprising a spring braced between the column bolt and the housing and urging the bolt into locking engagement with the column.

3. The improved security system defined in claim 1 wherein the solenoid means is engageable with one of the arms of the lever.

4. The improved security system defined in claim 1 wherein the switch is an on-of switch and the barrel is formed with a camming groove engaging the switch.

5. The improved security system defined in claim 1, further comprising means including a link formation on the barrel engaging the column bolt for displacing same out of engagement with the column on displacement of the barrel into the other barrel end position.

6. The improved security system defined in claim 5, further comprising a spring braced between the column bolt and the housing and urging the bolt into locking engagement with the column.

7. The improved security system defined in claim 1 wherein the housings and barrel are shaped such that the lock pin is held in the locking position except when the barrel is in its one end position.

* * * * *